(12) United States Patent
Bauer et al.

(10) Patent No.: US 9,667,746 B2
(45) Date of Patent: May 30, 2017

(54) EXECUTING A DEBUGGING OPERATION DURING DEPLOYMENT OF A BLUEPRINT WITHIN A CLOUD SYSTEM

(71) Applicant: Oracle International Corporation, Redwood Shores, CA (US)

(72) Inventors: Jonathan Asher Bauer, Andover, MA (US); Guillaume Nicolas Vambenepe, Sunnyvale, CA (US); Frederick H. Carter, Fremont, CA (US)

(73) Assignee: Oracle International Corporation, Redwood Shores, CA (US)

( * ) Notice: Subject to any disclaimer, the term of this patent is extended or adjusted under 35 U.S.C. 154(b) by 687 days.

(21) Appl. No.: 13/743,146

(22) Filed: Jan. 16, 2013

(65) Prior Publication Data
US 2014/0201372 A1    Jul. 17, 2014

(51) Int. Cl.
*G06F 13/00* (2006.01)
*H04L 29/08* (2006.01)

(52) U.S. Cl.
CPC .............. *H04L 67/36* (2013.01); *H04L 67/34* (2013.01)

(58) Field of Classification Search
CPC ... H40L 67/00; H40L 67/34; H04L 29/08144; H04L 29/06; H04L 29/08072; H04L 29/08171; H04L 12/5695; H04L 67/36
USPC ........................................................ 709/226
See application file for complete search history.

(56) References Cited

U.S. PATENT DOCUMENTS

| | | | |
|---|---|---|---|
| 6,249,907 B1 * | 6/2001 | Carter et al. | 717/129 |
| 8,805,921 B2 * | 8/2014 | Deng et al. | 709/201 |
| 9,058,219 B2 * | 6/2015 | Jaisinghani et al. | |
| 2004/0133386 A1 * | 7/2004 | Swoboda et al. | 702/176 |
| 2009/0063907 A1 * | 3/2009 | Tsuboi et al. | 714/48 |
| 2011/0185063 A1 * | 7/2011 | Head et al. | 709/226 |
| 2011/0213885 A1 * | 9/2011 | Kelkar et al. | 709/226 |
| 2011/0321033 A1 * | 12/2011 | Kelkar et al. | 717/174 |
| 2012/0266168 A1 * | 10/2012 | Spivak et al. | 718/1 |
| 2012/0324070 A1 * | 12/2012 | Campion et al. | 709/223 |

(Continued)

FOREIGN PATENT DOCUMENTS

WO    WO 2012069064 A1 *  5/2012

OTHER PUBLICATIONS

Dinkar Sitaram, Geetha Manjunath, Moving to the Cloud: Developing Apps in the New World of Cloud Computing, Nov. 16, 2011, Elsevier, p. 82.*

(Continued)

*Primary Examiner* — Robert B Harrell
(74) *Attorney, Agent, or Firm* — Hickman Palermo Becker Bingham LLP

(57) ABSTRACT

Tools are provided to assist users of cloud computing systems to create, monitor, and debug the resource instances they need. Specifically, resource instances are created in a cloud computing system based on a blueprint that is provided to a blueprint processor. The blueprint declaratively defines the resources that the user needs to have created in the cloud. Based on the information contained in blueprint, the blueprint processor causes the cloud to orchestrate the creation of resource instances, doing so in parallel when possible, and to configure those resource instances as specified in blueprint. Techniques are described for generating a timeline to convey status during the deployment process, and for performing debugging operations.

15 Claims, 11 Drawing Sheets

(56) References Cited

U.S. PATENT DOCUMENTS

2013/0232480 A1* 9/2013 Winterfeldt et al. ......... 717/177
2013/0232498 A1* 9/2013 Mangtani et al. ............ 718/104
2013/0238805 A1* 9/2013 Catrein et al. ................ 709/226
2015/0180949 A1* 6/2015 Maes et al. ................... 709/223

OTHER PUBLICATIONS

Dinh Khoa Nguyen et al. "Blueprinting Approach in Support of Cloud Computing", Future Internet 2012, 4, pp. 322-346; doi:10.3390/fi4010322 Published Mar. 19, 2012.*

* cited by examiner

```
Resources:
  MyDB:
    Container: ...
    Properties: ...
```

FIG. 2A

```
Inputs:
  UserId:
    Type: String
    Default: QA_user
  Password: ...
    Type: String
    Sensitive: True
Resources:
  MyDB:
    Container: ...
    Properties: ...
```

FIG. 2B

```
Resources:
  MyDB:
    Container: ...
    Properties:
      destination_zone: ...
      params:
        user: app_user
        password: change_me
```

FIG. 3A

```
Resources:
  MyDB:
    Container:
      f_getTemplateURI:
        - Simple DB Template
        - dbaas
    Properties:
      destination_zone:
        f_getZoneURI:
          - East Coast
          - dbaas
      params:
        user: app_user
        password: change_me
```

FIG. 3B

```
Inputs:
  UserId:
    Type: String
    Default: QA_user
  Password:
    Type: String
    Sensitive: True
Resources:
  MyDB:
    Container:
      f_getTemplateURI:
        - Simple DB Template
        - dbaas
      Properties:
        destination_zone:
          f_getTemplateURI:
            - Simple DB Template
            - dbaas
          Properties:
            destination_zone:
              f_getZoneURI:
                - East Coast
                - dbaas
              password:
                params
                  f_path:
                    - 'Inputs.Password.Value'
```

FIG. 4A

```
Data:
  UserId: QA_user
  Password: changeMe
Resources:
  MyDB1:
    Container:
      f_getTemplateURI:
        - Simple DB Template
        - dbaas
      Properties:
        destination_zone:
          f_getZoneURI:
            - East Coast
            - dbaas
          params:
            user:
              f_path:
                - 'Data.UserId'
            password:
              f_path:
                - 'Data.Password'
  MyDB2:
    Container:
...
```

FIG. 4B

```
Inputs:
  DbPassword:
    Type: String
    DefaultValue: welcome1
    Prompt: Database password to use for user app_user
    Sensitive: True
Data:
  JDBCCreds:
    user: system
    password: sysman
Resources:
  MyDB:
    Container:
      f_getTemplateURI:
        - Small DB
      params:
        user:
          f_path:
            - 'Data.UserId'
        password:
          f_path:
            - dbase
            - 'Data.Password'
      params:
        user: app_user
        password:
          f_path:
            - 'Inputs.DbPassword.Value'
  MyWebServer:
    Container:
      f_getTemplateURI:
        - Small WLS
        - java
      Properties:
        destination_zone:
          f_getZoneURI:
            - Zone1
            - java
      params:
        user: app_user
        password: pw_you_should_change
  MyDS:
    Type: Datasource
    Container:
      f_getResourceURI:
        - MyWebServer
    Properties:
      Name: QA_app_DS
      UserPW:
        - f_path:
          - 'Inputs.DbPassword.Value'
        JDBCConnectString:
          f_getResourceAttr:
            - MyDB
            - connect_string
      UserName: app_user
  MyApp:
    Type: ApplicationInstanceDeployment
    Container:
      f_getResourceURI:
        - MyWebServer
    Properties:
      Name: someOfEAR
      Version: 1
Outputs:
  URL:
    Description: URL of the deployed app
    Value:
      f_getResourceAttr:
        - MyApp
        - applicationURL
```

FIG. 5

```
C:\Users\jabauer\mywork>bp_processor.py sim06_4_resources.yml -c https:...

Blueprint Processor - Invocation Summary
----------------------------------------
    Cloud URI:               https://...
    User:                    sysman
    Blueprint file:          sim06_4_resources.yml
    Timeout:                 90 minutes, 0 seconds
    Refresh frequency:       15 seconds
    Inputs:
    Pause points:            (none)
    Debug logging:           False
    Instance name:           default_instance_name
    Visualization report dir:
    Versions:
        Blueprint processor: 12.1.0.5, 10-Oct-2012
        Cloud protocol:      10001
```

FIG. 6A

```
Input Parameter Value Entry
---------------------------
    Zone to use for db (DbZoneEastURI):
    Password to use for db (welcome1):
```

FIG. 6B

```
14:10:19 INFO:
14:10:19 INFO: Resource State Timeline
14:10:19 INFO: -----------------------
14:10:19 INFO:    State Key:
14:10:19 INFO:       e : Evaluating
14:10:19 INFO:       ep: Evaluation pending. (See right side for pendee)
14:10:19 INFO:       es: Evaluation succeeded
14:10:19 INFO:       EF: Evaluation failed
14:10:19 INFO:       c : Creating
14:10:19 INFO:       CF: Creation failed
14:10:19 INFO:       CS: Creation succeeded. State = READY
14:10:19 INFO:
```

FIG. 6C

```
18:14:23  INFO:
18:14:23  INFO:                MyApp
18:14:23  INFO:             /
18:14:23  INFO:            /    MyDB
18:14:23  INFO:           /    /
18:14:23  INFO:          /    /    MyDS
18:14:23  INFO:         /    /    /
18:14:23  INFO:        /    /    /    MyWebServer
18:14:23  INFO:       /    /    /    /
18:14:23  INFO:   --------------------
18:14:23  INFO:   |    |    |    | e  |
18:14:23  INFO:   |    |    |    | es |
18:14:23  INFO:   |    |    |    | c  |
18:14:23  INFO:   |    | e  |    | .  |
18:14:23  INFO:   |    | es |    | .  |
18:14:23  INFO:   |    | c  |    | .  |
18:14:23  INFO:   |    | .  | e  | .  |
18:14:23  INFO:   |    | .  | ep | .  | Awaiting creation of MyWebServer
18:14:23  INFO:   | e  | .  |    | .  |
18:14:23  INFO:   | ep | .  |    | .  | Awaiting creation of MyWebServer
18:14:25  INFO:   |    | .  |    | CS |
18:14:25  INFO:   |    | .  |    |====|
18:14:25  INFO:   |    | .  | ep |    | Awaiting creation of MyDB
18:14:25  INFO:   | es | .  |    |    |
18:14:25  INFO:   | c  | .  |    |    |
18:14:27  INFO:   | CS | .  |    |    |
18:14:27  INFO:   |====| .  |    |    |
18:14:29  INFO:   |    | CS |    |    |
18:14:29  INFO:   |    |====|    |    |
18:14:29  INFO:   |    |    | es |    |
18:14:29  INFO:   |    |    | c  |    |
18:14:33  INFO:   |    |    | CS |    |
18:14:33  INFO:   |    |    |====|    |
18:14:33  INFO:   --------------------
18:14:33  INFO:
```

FIG. 7

```
17:53:50 INFO: Output Processing
17:53:50 INFO: ----------------
17:53:50 INFO:
17:53:50 INFO: Output values specified: 1
17:53:50 INFO:    Value of URL: https://...
```

FIG. 8A

```
17:53:50 INFO: Blueprint Processing Summary
17:53:50 INFO: ----------------------------
17:53:50 INFO:
17:53:50 INFO: Resource State Summary:
17:53:50 INFO:    MyWebServer: READY
17:53:50 INFO:       URI: <a URI, not shown>
17:53:50 INFO:       Resource status: READY
17:53:50 INFO:       Timing info:
17:53:50 INFO:          Creation start:  17:53:46
17:53:50 INFO:          Creation end:    17:53:48
17:53:50 INFO:          Duration (secs): 2.0
17:53:50 INFO:    MyDB: READY
17:53:50 INFO:       URI: <a URI, not shown>
17:53:50 INFO:       Resource status: READY
17:53:50 INFO:       Timing info:
17:53:50 INFO:          Creation start:  17:53:46
17:53:50 INFO:          Creation end:    17:53:48
17:53:50 INFO:          Duration (secs): 2.0
17:53:50 INFO:    MyDS: READY
17:53:50 INFO:       URI: <a URI, not shown>
17:53:50 INFO:       Resource status: READY
17:53:50 INFO:       Timing info:
17:53:50 INFO:          Creation start:  17:53:48
17:53:50 INFO:          Creation end:    17:53:50
17:53:50 INFO:          Duration (secs): 2.0
17:53:50 INFO:    MyApp: READY
17:53:50 INFO:       URI: <a URI, not shown>
17:53:50 INFO:       Resource status: READY
17:53:50 INFO:       Timing info:
17:53:50 INFO:          Creation start:  17:53:48
17:53:50 INFO:          Creation end:    17:53:50
17:53:50 INFO:          Duration (secs): 2.0
>>... (fix this... pause point was removed in this rev of example)
18:04:14 INFO:
18:04:14 INFO: Timing Summary (seconds):
18:04:14 INFO:    Client-side CPU time: 0.265
18:04:14 INFO:    Elapsed time:
18:04:14 INFO:       Processing time:   4.1
18:04:14 INFO:       Paused time:       631.7
18:04:14 INFO:       Total elapsed time: 635.9
```

FIG. 8B

```
Paused: h
Commands are...
    p[ath] <path expression>: evaluate path expr
    e[val]:                   read & evaluate blueprint expression
    c[ontinue]:               continue blueprint instantiation
    x[it]:                    exit blueprint processor
    h[elp]:                   (this command)
If first token isn't a command, the line is treated as a path expression
Paused:
```

FIG. 9A

```
C:\\bpWork>bp_processor.py in2.yml  -c sim -u jb -p mypw -R
Blueprint Orchestrator
----------------------
    Blueprint file:    interactiveTests/completed/in2.yml
    Timeout (seconds): 665
    Inputs:
    Cloud URI:         https://... >>
    User:              sysman
    Break before:      Resources
    Debug logging:     False
    Instance name:     default_instance_name 18:46:06 WARNING: No Resources specified in blueprint.  Nothing will be created
18:46:06 INFO: Creating blueprint instance named default_instance_name
Myprompt (def_abc):
MyNum:

...Pause point, prior to processing Resources section...
For command info, enter (h)elp
Paused: path Inputs
MyNum: {Sensitive: true, Type: Number, Value: '123'}
MyString: {DefaultValue: def_abc, Prompt: Myprompt, Sensitive: false, Type: String,
    Value: def_abc}

Paused: Inputs.MyNum
{Sensitive: true, Type: Number, Value: '123'}

Paused:
```

FIG. 9B

```
Paused: e
  Eval: f_getTemplateURI:
  Eval:    - JaaS Template
  Eval:    - jaas
  Eval:
18:05:01 ERROR: Name not found: JaaS Template
Expression evaluation stack follows (with failed expression & diagnostic at bottom) ...
-----
|   Expr: {'f_getTemplateURI': ['JaaS Template', 'jaas']}
|   Expr: {'f_path': [{'f_findByName': [{'f_path': [{'f_findByName': [{'f_path':
['Cloud.service_types.elements']}, 'jaas']}, '.uri->
.service_templates.elements']}, 'JaaS Template']}, '.uri']}
|   Expr: {'f_findByName': [{'f_path': [{'f_findByName': [{'f_path':
['Cloud.service_types.elements']}, 'jaas']}, '.uri->.service_tem
plates.elements']}, 'JaaS Template']}
|   Expr: {'f_findOne': [{'f_path': [{'f_findByName': [{'f_path':
['Cloud.service_types.elements']}, 'jaas']}, '.uri->.service_templa
tes.elements']}, {'f_EQ': [{'f_path': ['name']}, 'JaaS Template']}, {'f_concat': ['Name
not found: ', 'JaaS Template']}]}
| End of stack for error message: Name not found: JaaS Template
-----
Paused:
```

FIG. 10A

```
Paused: e
  Eval: f_getTemplateURI:
  Eval:    - JaaS   Template
  Eval:    - jaas
  Eval:
/em/cloud/jaas/javaplatformtemplate/C086733BCCF2A4F3E040F10A716049A8
Paused:
```

FIG. 10B

EXECUTING A DEBUGGING OPERATION DURING DEPLOYMENT OF A BLUEPRINT WITHIN A CLOUD SYSTEM

BACKGROUND

Cloud computing involves the use of computing resources (hardware and software) that are delivered as a service over a network (typically the Internet). One type of cloud computing service is referred to as Platform as a Service (PaaS). In the PaaS model, the consumer creates software using tools and/or libraries from the provider. The consumer also controls software deployment and configuration settings. The provider provides the networks, servers, storage and other services.

PaaS offerings facilitate the deployment of applications without requiring the users to incur the cost and complexity of buying and managing the underlying hardware and software, and provisioning hosting capabilities. PaaS offerings may include, for example, facilities for application hosting, application design, application development, application testing, team collaboration, web service integration and marshalling, database integration, security, scalability, storage, persistence, state management, application versioning, application instrumentation and developer community facilitation. These services are generally provisioned as an integrated solution over the web.

Users of PaaS environments generally need to create systems that include multiple instances of cloud-based resources ("resource instances"). For the environments to work as intended, the resource instances must be configured properly. Typically, this includes setting configurations so that resource instances know of and can reference attributes of other resource instances.

One known approach for creating/configuring resource instances involves providing a set of commands to perform individual operations to create the resource instances and to manipulate their configuration. The commands may be submitted by a user either via a graphical user interface or a command-line interface. When using this technique, the user must determine the appropriate order of creation, and monitor the creation processes. Typically, values generated during the creation of some resource instances must be provided as input when creating other resource instances.

As the complexity of a user's system increases, so does the difficulty of creating and configuring the resource instances the system requires. Thus, it is desirable to provide tools that facilitate resource instance creation, configuration and debugging, within cloud computing environments.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

In the drawings:

FIG. 2A is a block diagram that illustrates how such a section of a blueprint could be structured, according to one embodiment;

FIG. 2B is a block diagram that illustrates the section of FIG. 2A with the addition of an "Inputs" section;

FIG. 3A is a block diagram that illustrates a blueprint that specifies a single resource to create a database service instance;

FIG. 3B is a block diagram that illustrates a blueprint that specifies intrinsic functions;

FIG. 4A is a block diagram of the blueprint illustrated in FIG. 3B to which two parameters have been added;

FIG. 4B is a block diagram of a blueprint with a Data section,

FIG. 5 is a block diagram that illustrates a more complex blueprint that may be used to create a database and an application that uses the database, according to an embodiment;

FIG. 6A is a block diagram that illustrates an invocation summary, according to an embodiment;

FIG. 6B is a block diagram that illustrates a prompt for input values for parameters specified in a blueprint;

FIG. 6C is a block diagram illustrating "key" information that may be output to assist in understanding a vertical timeline, according to an embodiment;

FIG. 7 is a block diagram that illustrates a vertical timeline that may be generated during blueprint deployment to periodically inform users of status changes in the operation of deploying the cloud resource instances identified in the blueprint;

FIG. 8A is a block diagram illustrating output produced by processing the outputs section of a blueprint, according to one embodiment;

FIG. 8B is a block diagram illustrating a summary that may be generated after deployment of a blueprint;

FIG. 9A is a block diagram of a list of commands that a user may submit using an interactive cloud explorer, according to one embodiment;

FIG. 9B is a block diagram illustrating what may be displayed when a user pauses a blueprint deployment operation to execute a debugging operation, according to an embodiment;

FIG. 10A is a block diagram that illustrates output that may be produced when a user uses the Eval command, with an extra space, while in debugging mode;

FIG. 10B is a block diagram that illustrates output that may be produced when a user uses the Eval command, without an extra space, while in debugging mode.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

Figure 1:
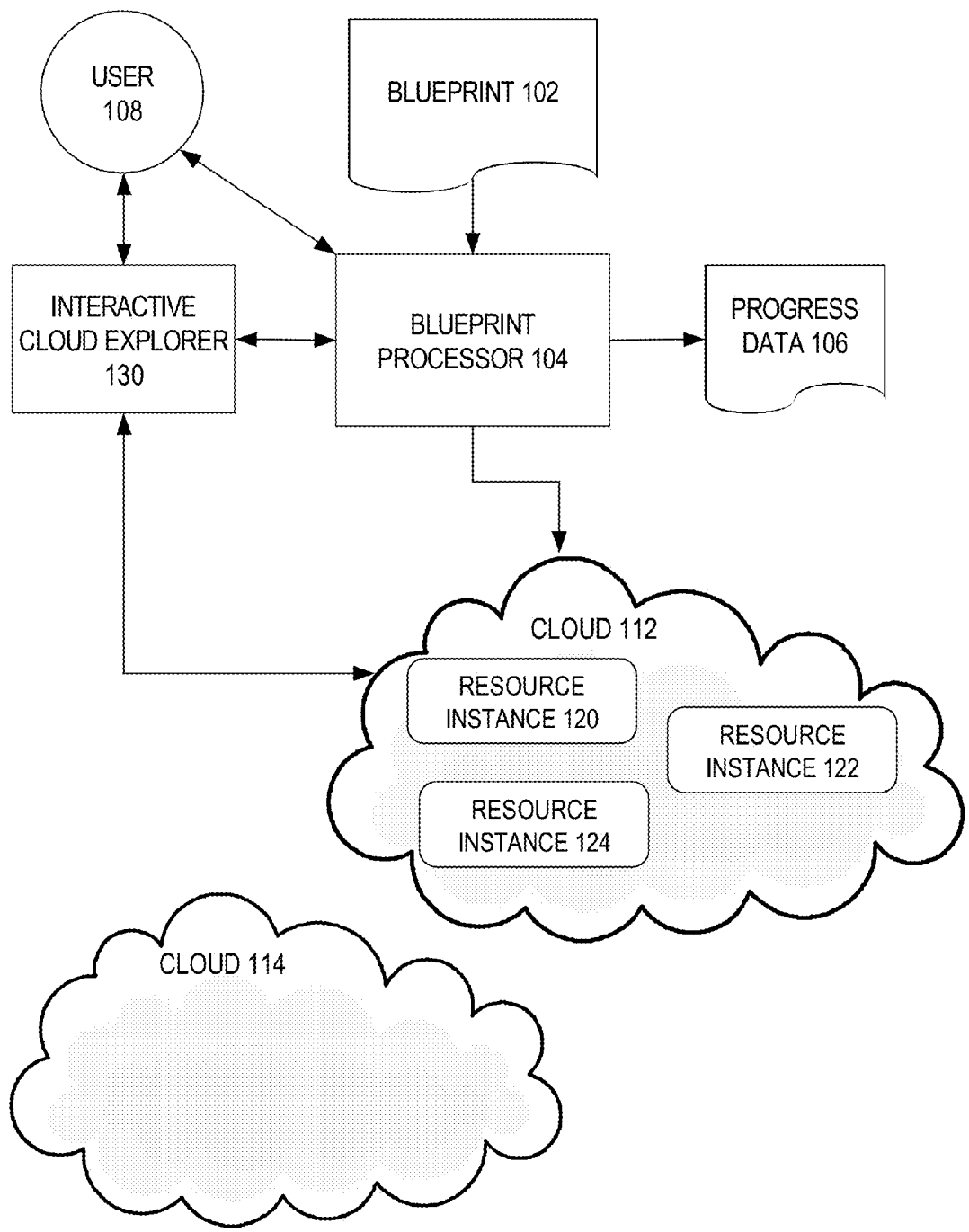
FIG. 1 is a block diagram of a system for creating, monitoring and debugging resource instances in a cloud environment, according to an embodiment of the invention.

Tools are provided to assist users of cloud computing systems to create, monitor, and debug the resource instances they need. Referring to FIG. 1, it is a block diagram that illustrates various tools that may be used by a user 108 to create, monitor and debug resource instances created in a cloud computing system, according to an embodiment of the invention. Specifically, resource instances 120, 122 and 124 are created in a cloud computing system, such as cloud 112, based on a blueprint 102 that is provided to a blueprint processor 104. The blueprint 102 declaratively defines the resources that the user 108 needs to have created in cloud 112. Based on the information contained in blueprint 102, blueprint processor 104 causes cloud 112 to create resource instances 120, 122 and 124, and causes cloud 112 to configure those resource instances as specified in blueprint 102.

According to one embodiment, blueprint 102 does not indicate how resource instances should be created. How the resource instances are created is determined by cloud 112. Further, according to one embodiment, blueprint 102 also does not indicate the sequence in which the resource instances are to be created. Instead, blueprint processor 104 automatically determines the sequence in which the resource instances are created based on dependencies specified within blueprint 102.

While blueprint processor 104 facilitates the resource instance creation and configuration process, interactive cloud explorer 130 facilitates monitoring and debugging the resource instances during and after their creation. For example, according to one embodiment, user 108 may interact with interactive cloud explorer 130 to query the current state of blueprint processor 104 as blueprint processor 104 is processing a particular blueprint 102. In response to the query, blueprint processor 104 may communicate to interactive cloud explorer 130 data that indicates the resource instances whose creation has been completed, and how much progress has been made on resource instances whose creation has not yet been completed. While blueprint processor 104 and interactive cloud explorer 130 are illustrated as separate entities for the purpose of explanation, they may actually be packaged in a single application, or any number of distinct applications.

Interactive cloud explorer 130 may also be used to obtain information about already-created resource instances. For example, cloud explorer 130 may communicate directly with cloud 112 to determine the current value of certain attributes of resource 120. Various ways in which interactive cloud explorer 130 may directly interact with cloud 112 shall be described in greater detail hereafter.

According to one embodiment, blueprint processor 104 is configured with a progress report module that generates progress data 106 while blueprint processor 104 is processing a blueprint 102. As shall be described in greater detail hereafter, the progress data 106 generated by blueprint processor may include a "vertical timeline" that indicates the state that various resource instances are in during specific time intervals. Blueprint processor 104, as well as blueprint 102 and progress data 106, shall be described in greater detail hereafter.

Example Use of Blueprints

As mentioned above, blueprints (such as blueprint 102) are used to describe a set of inter-related cloud resources that a user wants to exist. Like architectural blueprints, the blueprints describe what the user wants, i.e. the components and their characteristics including how they are configured to interact, but not how to build them. For instance, in one embodiment, the blueprints do not describe the order in which to create the components. Blueprint orchestration logic, contained within blueprint processor 104, figures out the order in which to create the components based on inter-resource dependencies specified in the blueprints.

For example, assume that user 108 wants to create a set of interacting cloud resources, such as an application server (e.g. a Java Enterprise Edition (JEE) server), an application, and a database. The user 108 would need to create a database instance and an application server instance, deploy the application, and create a JEE datasource for use by the application server to connect to the database.

It is possible for user 108 to accomplish all of these tasks by manually sending commands through a user interface (e.g. an EM SSA interface). Specifically, user 108 might request creation of the application server and database, and then wait for either to complete. When the application server is created, user 108 can deploy the application. When both the application server and database are created, user 108 can then create the JEE datasource.

Alternatively, user 108 can employ the techniques described herein and use a blueprint 102 that describes the four cloud resources. User 108 may request blueprint processor 104 to instantiate the blueprint and provide to blueprint processor 104 any input parameter values the blueprint author chose to support. In response, the blueprint 102 is fed into blueprint processor 104, where orchestration logic initiates creation of any resources it can create immediately, and then monitors the creation process so that it can initiate creation of any dependent resources as soon as their required resources are created.

Thus, the resources may be created by blueprint processor 104 in the same order as the resource instances would have been created if instantiated manually, but without requiring user 108 to incur the overhead of the manual instantiation process.

Interaction of Blueprint Processor and Cloud

As mentioned above, blueprint processor 104 causes resource instances to be created within a cloud based on the objects defined in blueprint 102. The actual manner in which blueprint processor 104 interacts with a cloud may vary from implementation to implementation based on the cloud in which the resource objects are being created. Typically, each provider of cloud computing resources designs an API through which external entities can interact with their services. In one embodiment, blueprint processor 104 supports interactions with many different types of cloud computing services, and therefore contains logic for translating the same blueprint into calls for any one of a number of different APIs.

For the purpose of illustration, examples shall be given in which cloud 112 is a cloud provided by Oracle's cloud computing service. Consequently, blueprint processor 104 causes resource instances 120, 122 and 124 to be created by making calls to the Oracle Cloud API. However, the techniques described herein are not limited to any particular cloud computing service. Thus, cloud 114 may be provided by a different cloud computing service than cloud 112, and may have a substantially different API though which blueprint processor 104 interacts.

The Oracle Cloud API

As mentioned above, examples shall be given herein in which blueprint processor 104 interacts with cloud 112 through the Oracle Cloud API. The Oracle Cloud API defines a programming interface to consumers of IaaS, MWaaS, and DBaaS based on Oracle's solution stack. The Oracle Cloud Resource Model details the types of resources one can manipulate via the Oracle Cloud API and, for each type, both its attributes and the operations that can be performed on instances of a resource type. In the Oracle Cloud Resource Model, all cloud resource types also have a set of common attributes such as a URI and status. In one embodiment, the resource types include:

DatabaseTemplate: Used to describe/create database instances. It has attributes such as name, description, and params. The latter describes the template-specific parameters one uses to describe the instance to create.

DatabaseInstance: Represents a database service instance. It has attributes such as name (used to create the database) and connect_string.

JavaPlatformTemplate: Used to describe/create middleware (JEE server) instances. Like DatabaseTemplate, It has attributes such as name, description, and params.

JavaPlatformInstance: A JEE server instance.

ApplicationInstanceDeployment: Represents an application deployed to a MwPlatformInstance.

Datasource: Represents a datasource of a MwPlatformInstance. It is contained in a MwPlatformInstance and refers to a DatabaseInstance.

A cloud resource can contain other resources. For example, a JavaPlatformTemplate resource named 'Small Server' contains all MwPlatformInstance's created using 'Small Server'.

Blueprints

As mentioned above, a blueprint describes one or more cloud resources to be created. A user deploys a blueprint to create the resources described by the blueprint, at which time he provides any input parameter values used by the blueprint.

To create each resource instance, the blueprint specifies its attribute values, which may be hard-coded, come from blueprint input parameters, or gleaned from other resources. In instantiating all the resource instances, the blueprint processor 104 determines the resource dependencies and uses this to order the resource creation and/or configuration required to properly create the instances described by a blueprint.

According to one embodiment, a blueprint can define input 'parameters'. Each parameter definition specifies a name, datatype and optional specifications such as default value. A user who deploys a blueprint must specify the value for all parameters not having a default.

A blueprint 'resource' defines how to construct a cloud resource. According to one embodiment, the blueprint resource specifies a set of attributes and the parent cloud resource that is to contain the newly created resource. Each resource in a blueprint also has a name, which must be unique within a blueprint.

If outputs are specified in a blueprint, the specified values are displayed when blueprint deployment completes. Output parameters can be used to display information derived during deployment, such as to inform the end user of the URL of a JEE application deployment.

According to one embodiment, the blueprint language includes a set of predefined functions, which shall be described in detail below. In addition, as a programming convenience, blueprints can include a Data section. This is commonly used to specify symbolic names for literal values.

Example Blueprints

According to one embodiment, blueprint 102 is a YAML document that has certain sections. While such an embodiment is described herein for the purpose of explanation, the techniques described herein are not limited to blueprints of any particular document type or format.

In one embodiment, the simplest useful blueprint specifies only a 'Resources' section and a single resource. FIG. 2A illustrates how such a section could be structured, according to one embodiment. In the example illustrated in FIG. 2A, the resource is a database defined by a template.

Specifically, the blueprint illustrated in FIG. 2A defines one blueprint resource named MyDB. The Container entry identifies the parent cloud resource to contain the newly created object. Being a database service instance, it will be created in a container element of the database template used to create the service. An "Inputs" section may be added, as illustrated in FIG. 2B.

When the user requests deployment of this blueprint, the user provides a value for the UserId parameter or takes the default specified by the blueprint (QA_user). No default value is specified for the Password parameter, so the user will have to provide a value. After input processing, the parameter values can be referenced from other parts of the blueprint, in particular to provide attribute values needed to create resources.

Example Blueprint: Database Server Instance

As explained above, within a blueprint, "blueprint resources" describe the cloud resource instances to be created. In one embodiment, for each blueprint resource, the information required by the Cloud Resource Model is provided. The blueprint illustrated in FIG. 3A specifies a single resource to create a database service instance.

According to one embodiment, each resource definition in a blueprint specifies a name, a Container into which to add the resource, and Properties used to specify the characteristics of what to create. In the example illustrated in FIG. 3A, the name of the blueprint resource is MyDB. The name is used in the scope of a blueprint, e.g. to inform the user deploying a blueprint about progress for each resource. In more complex cases, the name can be referenced elsewhere within a blueprint.

The Container entry specifies the URI of the container to which the new resource will be added. To create a database service instance, the user identifies the SSA template that corresponds to the kind of database that is desired.

The Properties entry specifies values needed to create the resource. In this case, the model requires that that the user specify the destination_zone and params property. The params, in turn, is a list of name/value pairs required by the selected template.

Intrinsic Functions

According to one embodiment, to operate on data, blueprints support the use of intrinsic functions. For the purpose of explanation, all function names referred to herein begin with "f_" and are invoked with a list of arguments.

Continuing with the example blueprint illustrated in FIG. 3A, two intrinsic functions may be used to return the URI of the desired container and the desired zone. A blueprint that specifies these functions is illustrated in FIG. 3B.

As illustrated in FIG. 3B, the f_getTemplateURI function takes two arguments: the name of the template and its service type.

Example: Resources with Parameters

FIG. 4A is a block diagram of the blueprint illustrated in FIG. 3B to which two parameters have been added. Due to the addition of the parameters, the user who deploys the blueprint can specify which user id and password to use.

The Inputs section defines the two input parameters and the values of the parameters are accessed via the 'f_path' intrinsic function.

The 'f_path' function is used to evaluate path expressions to access any data in a blueprint as well as any data to which a user has access in the SSA cloud. In the present example, the path expression simply uses the dot operator to access nested attributes, i.e. first access the Inputs attribute (i.e. the Inputs section) of the blueprint and within that, the UserId attribute, and within that the Value attribute.

Example: the Data Section

For the purposes of explanation, assume that a blueprint creates several databases and that the blueprint creator does not want to prompt the blueprint user for a user id and password. Furthermore, the blueprint creator may want to code the blueprint so that it is easy to change the password later.

In a procedural language, a programmer would use a named literal in order to document the intent and so that the programmer could change the password once at the top of the code. Within a blueprint, a blueprint creator may accomplish this by using a Data section, as illustrated in FIG. 4B. In the embodiment illustrated in FIG. 4B, the Data section takes a YAML structure, which can be traversed via the 'path' function, in the same way shown for Inputs earlier.

Example: Multiple Interdependent Resources

FIG. 5 illustrates a more complex blueprint that may be used to create a database and an application that uses the database, according to an embodiment. Specifically, the blueprint specifies four cloud resources: a database service instance, a middleware service instance, a datasource of the middleware service instance, and an application of the middleware service instance. In the illustrated embodiment, the parameters section includes a 'Prompt' instruction, which causes the blueprint processor 104 to prompt the blueprint user for input parameter values when the user issues the deploy command without providing the input parameter values on the command line.

The blueprint illustrated in FIG. 5 illustrates the ability to refer to attributes of created resources. For example, the Cloud Resource Model for Datasource defines a JDBCConnectString attribute whose value is required to create a Datasource. The contents of the string will not be available until after the database is created, so it is clearly not something the blueprint author can know in advance. Instead, the blueprint author uses an intrinsic function to refer to the needed property of the newly created database.

The Cloud Resource Model for DatabasePlatformInstance exposes a 'connect_string' property. Therefore, to refer to the needed property, the Datasource specifies the value of JDBCConnectString via the 'f_getResourceAttr' intrinsic function:

```
MyDS:
    ...
    Properties:
        ...
        JDBCConnectString:
            f_getResourceAttr:
                - MyDB
                - connect_string
        ...
```

During deployment of the blueprint, the blueprint processor 104 waits for the MyDB resource to be created and then executes the f_getResourceAttr function to return the value of MyDB's connect_string property.

Similarly, the creation of a Datasource is done by adding the Datasource to the JavaPlatformInstance that is created first. Consequently, the blueprint refers to the JavaPlatformInstance's URI.

```
MyDS:
    ...
    Container:
        f_getResourceURI:
            - MyWebServer
```

To process this f_getResourceURI function call, the blueprint processor 104 waits for the MyWebServer resource to be created and then returns its URI. In addition to adding a Datasource to MyWebServer, an ApplicationInstanceDeployment must be added to the MyWebServer, so the same approach is used for both.

As is evident by the example blueprint illustrated in FIG. 5, blueprint resources can refer to other resources, and the blueprint orchestration performed by blueprint processor 104 accounts for such dependencies, when the blueprints are being deployed, by creating resources in parallel when possible.

Blueprint Deployment

According to one embodiment, blueprint processor 104 makes calls to cloud 112 to create resource instances in parallel when possible, but a resource that depends on another resource cannot be created until the latter resource is created. Such dependencies are often implicit, but part of blueprint processing is to identify dependencies and orchestrate the overall steps.

According to one embodiment, user 108 may cause blueprint processor 104 to process a blueprint 102 by issuing a command using a command line interface. For example, the command may have the form:

bp_processor.py myfile.yml -u jabauer -c https://myhost/em/cloud

In this example, the -u option specifies the EM user id. The -c option is used to specify the cloud URL. Any number of other command line options are possible, and the techniques described herein are not limited to any particular command line options, or to interaction through a command line. Thus, in alternative embodiments, commands may be issued to blueprint processor 104 by interacting with controls provided by a graphical user interface.

As explained above, to create a resource instance from a blueprint, the runtime logic within blueprint processor 104 processes the input parameters and orchestrates the creation of resources, doing so in parallel when possible. The blueprint processor 104 also monitors progress and keeps the user informed.

Of course, the output a blueprint user will see during a blueprint deployment operation may depend on a variety of factors, including the blueprint being deployed and the environment in which the deployment is taking place. In the examples given hereafter, it is assumed that the blueprint illustrated in FIG. 5, which specifies an application server, application, database, and JEE DataSource, is being deployed.

According to one embodiment, at the initiation of a blueprint deployment operation, the progress data 106 generated by blueprint processor includes an "invocation summary", as illustrated in FIG. 6A. In the example invocation summary illustrated in FIG. 6A, much of the information reflects default values used because the blueprint user did not specify the corresponding options.

In the present example, the blueprint of FIG. 5 defines input parameters. Consequently, during deployment of that blueprint, blueprint processor 104, generates a prompt for values for those input parameters. Such a prompt is illustrated, for example, in FIG. 6B. While the prompt illustrated in FIG. 6B is a textual prompt typical of a command line interface, the prompts generated by blueprint processor 104 may take any form, such as a graphical pop-up window, an audible prompt, etc. Thus, the techniques described herein are not limited to any particular type of interface of style.

For the purpose of illustration, it shall be assumed that the blueprint user presses 'enter' to accept the default value for zone, DbZoneEastURI. The blueprint user also entered a password, but it is not visible in FIG. 6B because it was not echoed on the screen.

Once all needed information is provided by the blueprint user, the blueprint processor 104 enters the phase where it creates resources and monitors progress. According to one embodiment, the progress of this phase is depicted in progress data 106 as vertical timeline, where each resource to be created is represented by a column. As state transitions occur, they are noted in the vertical timeline.

The Vertical Timeline

According to one embodiment, blueprint processor 104 generates output that lists all possible states, with their abbreviations. This output serves as the "key" to assist the blueprint user in interpreting the vertical timeline. FIG. 6C is an example of the "key" display that may be output by blueprint processor 104.

In the embodiment reflected in FIG. 6C, the first step to process any resource definition is to evaluate the expressions of the definition that describe the resource (Cloud state: e). In some cases, evaluation must be delayed (state key: ep). Once fully evaluated, a creation request is made (state key: c). Resource creation may take some time, but if all goes well the processing for that resource completes successfully (state key: CS).

Based on the blueprint illustrated in FIG. 5, blueprint deployment proceeds in an opportunistic manner, where the specific order of operations may vary depending on how the cloud responds, as long as the dependencies between the objects are accounted for. As merely one example, the blueprint deployment may proceed as follows. First, the MyWebServer resource definition is evaluated (state key: e). This succeeds and creation begins (state key: c). While that takes place, evaluation of MyDB is done and creation initiated. Then MyDS is evaluated and the blueprint processor determines that evaluation cannot complete until MyWebServer is created. The same applies to MyApp. Eventually, the creation of MyDB and MyWebServer complete successfully (state key: CS), and creation of MyDB and MyDS can proceed.

This sequence of deployment is depicted in the vertical timeline illustrated in FIG. 7. Referring to FIG. 7, it is a vertical timeline that is generated by blueprint processor 104, as part of progress data 106, while the blueprint processor 104 is instantiating the resources defined in the blueprint shown in FIG. 5. The vertical timeline illustrated in FIG. 7 includes a header section 702, and a body section 750. The header section 702 lists the names of the resource instances being deployed, and indicates the correlation between resource instances and columns in the body section 750.

The body section 750 is formed by a sequence of text lines. As time passes and the status of resource instances change, additional lines are added to the bottom of the vertical timeline. Thus, the timeline grows vertically as the deployment progresses, until deployment completes or fails. FIG. 7 illustrates the vertical timeline generated during deployment of the blueprint illustrated in FIG. 5 after deployment has successfully completed.

As mentioned above, the body section 750 grows over time as new lines are added to the body section 750. Each line in the body section 750 of the vertical timeline has two main sections: a timestamp section 720 and a state section 722. The timestamp section 720 indicates the time at which the line is generated and displayed. The timestamps depicted in the timestamp section 720 are not typical of the timestamps of an actually deployment operation, which would generally have longer gaps of time between the generation of each line.

The state section 722 indicates the state of each of the resource instances at the time indicated by the timestamp section 720. To form the columns of the vertical timeline, the status of each resource instance is depicted at a particular horizontal offset. For example, character positions 20-21 of each line may be used to convey the status of the MyApp resource instance. Character positions 25-26 of each line may be used to convey the status of the MyDB resource instance. Character positions 29-30 of each line may be used to convey the status of the MyDS resource instance. Character positions 34-35 of each line may be used to convey the status of the MyWebServer resource instance. Between these character positions, a separating symbol, such as "|" may be used, to more clearly visually delineate the columns.

In the example illustrated in FIG. 7, line 704 indicates that at the time line 704 was generated by blueprint processor 104, MyWebServer was being evaluated, and nothing was occurring relative to the other resources defined in the blueprint. The evaluation of MyWebServer is indicated, within line 704, by an "e" in the character position associated with the MyWebServer status. The character positions associated with the other resource instances are empty.

Line 706 indicates that, at the time line 706 was generated by blueprint processor 104, MyWebServer's evaluation completed successfully. Line 708 indicates that, at the time line 708 was generated by blueprint processor 104, creation of the resource instance for MyWebServer was initiated.

The lines that were generated after line 708 and before line 710 indicate that, during that time interval, the creation operation for MyWebServer was ongoing. Further, the lines indicate that during that interval, the evaluation of MyDB occurred, and creation of the resource instance for MyDB was initiated. The creation of the resource instance for MyDB can be initiated before creation of the MyWebServer resource instance is completed because MyDB is not dependent on MyWebServer.

During this same interval, MyDS and MyApp were evaluated, but creation of their respective resource instances is not started during that interval because they both depend on MyWebServer.

Lines 710 and 712 indicate that, at the time lines 710 and 712 were generated by blueprint processor 104, MyWebServer's creation completed successfully. After the time represented by these lines, it is possible to start creating resource instances for resources that depend only on MyWebServer. Because MyApp only depends on MyWebServer, creation of the MyApp resource instance begins shortly after line 712. In contrast, MyDS also depends on MyDB, so the creation of MyDS is not initiated until MyDB has been successfully created.

Significantly, at any point during deployment of a blueprint, the vertical timeline that is being generated by the blueprint processor 104 easily and clearly communicates to the blueprint user all significant state changes that have occurred during the deployment operation, as well as the current state of each resource defined in the blueprint. Thus, it is much easier for the blueprint user to assess the status of the ongoing deployment operation than, for example, if the user had to piece things together from log records generated by the blueprint processor.

The generation and display of a new line of the vertical timeline may be triggered in a variety of ways. For example, generation of a new line may be triggered in response to occurrence of a change in the state relative to any of the resource instances. When triggered by state changes, each line will have at least one state change relative to the previously-generated line. Such is the case in the vertical timeline illustrated in FIG. 7.

On the other hand, generation of a new line may be triggered by the passing of time. For example, a new line may be generated each minute, or each five minutes. An embodiment in which lines are generated in response to the passage of time produces timelines where the distance between rows accurately reflects time between events. However, if the time intervals are too short, then the timeline may become so long as to be less useful. On the other hand, if the time intervals are too long, then multiple events may occur in the same line, making the order in which the events occurred unclear.

In one embodiment, both events and time intervals may cause the generation of new lines. For example, blueprint processor 104 may be configured to generate lines in response to events, but to also generate a line when more than a threshold amount of time has lapsed since the generation of the previous line. If the threshold is set to a relatively long duration, the timeline generated by such an embodiment would better reflect the passage of time, without causing the vertical timeline to become unreasonably long.

Post-Creation Output

According to one embodiment, blueprint processor 104 is configured to generate additional progress data 106 after all resource instances defined within the blueprint 102 have been successfully created. For example, in one embodiment, after creation, the blueprint processor 104 processes the Outputs section of the blueprint. For the blueprint depicted in FIG. 5, processing the Outputs section may produce the display illustrated in FIG. 8A. As illustrated in FIG. 8A, the blueprint specified one output value named "URL" and a value that is represented with 'https:// . . . '.

In addition, once all resources are successfully created, the blueprint processor 104 may generate a display that summarizes the results. Referring to FIG. 8B, it depicts a summary of what happened for each requested resource, as well as timing information for each resource and the overall run.

Debugging Deployment Operations

In addition to running the blueprint processor such that it deploys the blueprint and runs to completion, mechanisms are proved to allow blueprint users to debug blueprints. These mechanisms include interactive cloud explorer 130, which allows blueprint users to interactively display values used by the application that is being deployed. Depending on the deployment status of the relevant resource instance, interactive cloud explorer 130 may obtain the values from blueprint processor 104 and/or the cloud 112 in which the resources are being or have been created.

According to one embodiment, two mechanisms are provided to allow a blueprint user to enter the debugging mode of interactive cloud explorer 130 at a particular point of execution. The simpler approach, which will usually be sufficient, is to use command line options that cause execution to pause between processing phases. These are called "pause points" and are described below. If the blueprint user wishes to break at a more specific point, such as just prior to evaluating an expression for a specific resource's property, the user may edit the blueprint to include a breakpoint command.

In both cases, the interactive cloud explorer 130 enters a "debugger" mode when the point is reached. In the debugger mode, the blueprint user may enter various commands to display contents of the blueprint as well as that of the cloud to which the interactive cloud explorer 130 are connected.

Printing Intermediate Results

As explained above, blueprint processing involves evaluating expressions and creating resources once all required expressions have been evaluated. At any point during evaluation of an expression, a blueprint user may wish to see some intermediate results to confirm the value is what the blueprint user expected. To do so, blueprint user uses the intrinsic function f_print.

Wherever an expression can appear in a blueprint, the blueprint user may simply nest the expression in a call to f_print. Optionally, the blueprint user can include a second text message argument. When f_print is encountered by blueprint processor 104, the text message and expression value are printed.

Pause Points

As mentioned above, one way for a blueprint user to specify points at which to enter the debugger is via "pause points". In one embodiment, pause points are specified as command line options. In one embodiment, a blueprint user can specify that the blueprint processor 104 pause and the debugger mode begin at any of these points:

Prior to evaluating the Input section and prompting for Input parameters

Prior to evaluating the Resources section

Prior to evaluating the Output section

Prior to termination, but after output processing or detecting an error that will terminate processing When an error is encountered, just prior to termination Once the debugger mode is entered, the blueprint user can use various commands, as shall be described in greater detail hereafter. To continue blueprint execution after a pause, the blueprint user may enter the "continue" command.

Breakpoints

According to one embodiment, breakpoints are defined via an f_break intrinsic function. According to one embodiment, the f_break function has the format:

f_break(expression, [breakpointMessage])

When a call to the f_break function is encountered during deployment of a blueprint, blueprint processor 104 pauses evaluation of the blueprint, prints the optional message, and enters blueprint debugger mode, during which user 108 may use interactive cloud explorer 130 to perform various actions, such as obtain the current values of certain parameters.

The breakpointMessage parameter of the f_break function is where a blueprint user may specify a message to be printed when the intrinsic function is invoked, just prior to entering the debugger. The f_break function returns the value of the specified expression. The value is computed when the 'continue' command is entered.

Debugger Commands

When a blueprint user has entered the debugger mode, the user can enter certain commands. FIG. 9A depicts a list of commands that user 108 may submit using interactive cloud explorer 130 while in the debugging mode, according to one embodiment. This list may be displayed by interactive cloud explorer 130, for example, when the user submits the "help" command when in the debugging mode. The commands listed in FIG. 9A are merely examples of the types of commands that may be made available to user 108 through the interactive cloud explorer 130, and the techniques described herein are not limited to any particular set of debugging commands.

The commands listed in FIG. 9A include a "path" command. The "path" command is used to evaluate arbitrary path expressions. FIG. 9B is an example of output provided by interactive cloud explorer 130 in response to two path commands. Specifically, referring to FIG. 9B, it illustrates a command line string for initiating a blueprint deployment operation for the blueprint "in2.yml", which specifies two input parameters: MyNum and MyString.

During the deployment operation of in2.yml, the blueprint user is prompted for a value for the first parameter. In the interaction depicted in FIG. 9B, the user accepted the default value "def_abc" for the first parameter by pressing "enter" instead of entering a value.

When prompted for the second parameter value, the blueprint user entered "123" for MyNum, but because it was defined as "sensitive", the number was not shown in the output displayed by the interactive cloud explorer 130 (and is therefore not displayed in FIG. 9B).

In the deployment command shown in FIG. 9B, the command line options included "-R", which tells the blueprint processor 104 to pause just prior to evaluating the Resources section of the blueprint. Consequently, the "Paused" prompt appears in FIG. 9B.

In the output displayed in FIG. 9B, while blueprint processing is paused, the blueprint user enters the "path" command with the path expression "Inputs". The value of the Inputs section of the blueprint is then displayed on the interactive cloud explorer 130. In the present example, the value of the path expression "Inputs" is the two input parameters and their values. The values include both those provided by the blueprint and the current runtime values, in this case '123' and 'def_abc'.

After the interactive cloud explorer 130 has displayed the values for the expression "Inputs", the blueprint user enters "Inputs.MyNum" to view the value of MyNum in Inputs. In the present example, the "path" command is assumed if no explicit command is entered, so this is treated like "path Inputs.Mynum" and the value is printed. At this point, the blueprint user may enter the "Continue" command to resume blueprint processing.

In addition to the Path command discussed above, the list of debugging command depicted in FIG. 9A includes an "Exit" command and an "Eval" command. The Exit command terminates the current blueprint processing operation.

The Eval command is used to evaluate any expression that can be included in the blueprint. For example, assume that the blueprint user is debugging a blueprint and it appears to be failing when looking up a template by name. The blueprint user can use the eval command to evaluate expressions that appear in the blueprint. FIG. 10A illustrates output that may be produced when a user uses the Eval command while in debugging mode.

Referring to FIG. 10A, it illustrates a scenario in which a blueprint user attempts to evaluate an expression of interest as it appears in the blueprint. In the example shown in FIG. 10A, the blueprint user first enters the 'eval' or 'e' command. Then, the blueprint user enters the expression. In response to the expression evaluation request, the interactive cloud explorer 130 displays the same diagnostic information that was displayed when initially processing that portion of the blueprint. However, the blueprint user may now experiment with other values.

For the purpose of illustration, assume that after such experimentation, the blueprint user eventually realizes that there may be an extra space in the name. In response to requesting evaluation of the name with the extra space, the evaluation works, and the result of the expression evaluation, in this case a URI, is displayed. The evaluation command with the correct name, and the result it produces, is illustrated in FIG. 10B.

Interactive Cloud Explorer

In the examples given above, interactive cloud explorer 130 is used to submit and display the results of debugging commands (e.g. "path" and "eval") while debugging a blueprint. However, according to one embodiment, interactive cloud explorer 130 has any number of additional features to facilitate interaction between user 108 and both blueprint processor 104 and the cloud 112 in which the cloud computing application is being instantiated.

For example, according to one embodiment, user 108 is able to obtain the names and values of attributes of resource instances, but is also able to interactively set those names and values. As another example, the ability of interactive cloud explorer 130 to browse, evaluate, and set attributes is not limited to attributes of resources that are currently being deployed by blueprint processor 104. For example, user 108 may use interactive cloud explorer to obtain information about, and set values in, resource instances from any environment with which interactive cloud explorer 130 may connect. For example, interactive cloud explorer 130 may be used to obtain information about, or set values in, resource instances 120, 122 and 124 even though those resource instances may not relate to any deployment operation currently being performed by blueprint processor 104.

While a deployment operation is in progress, interactive cloud explorer 130 may be used to browse local state information maintained by blueprint processor, as well as the remote state information maintained within the target cloud. Thus, expressions and paths may be evaluated, status information may be obtained, and parameter values associated with resource instances may be set, regardless of whether the resource object of interest has not yet been created, is in the process of being created, or has been fully created within the cloud.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 11:
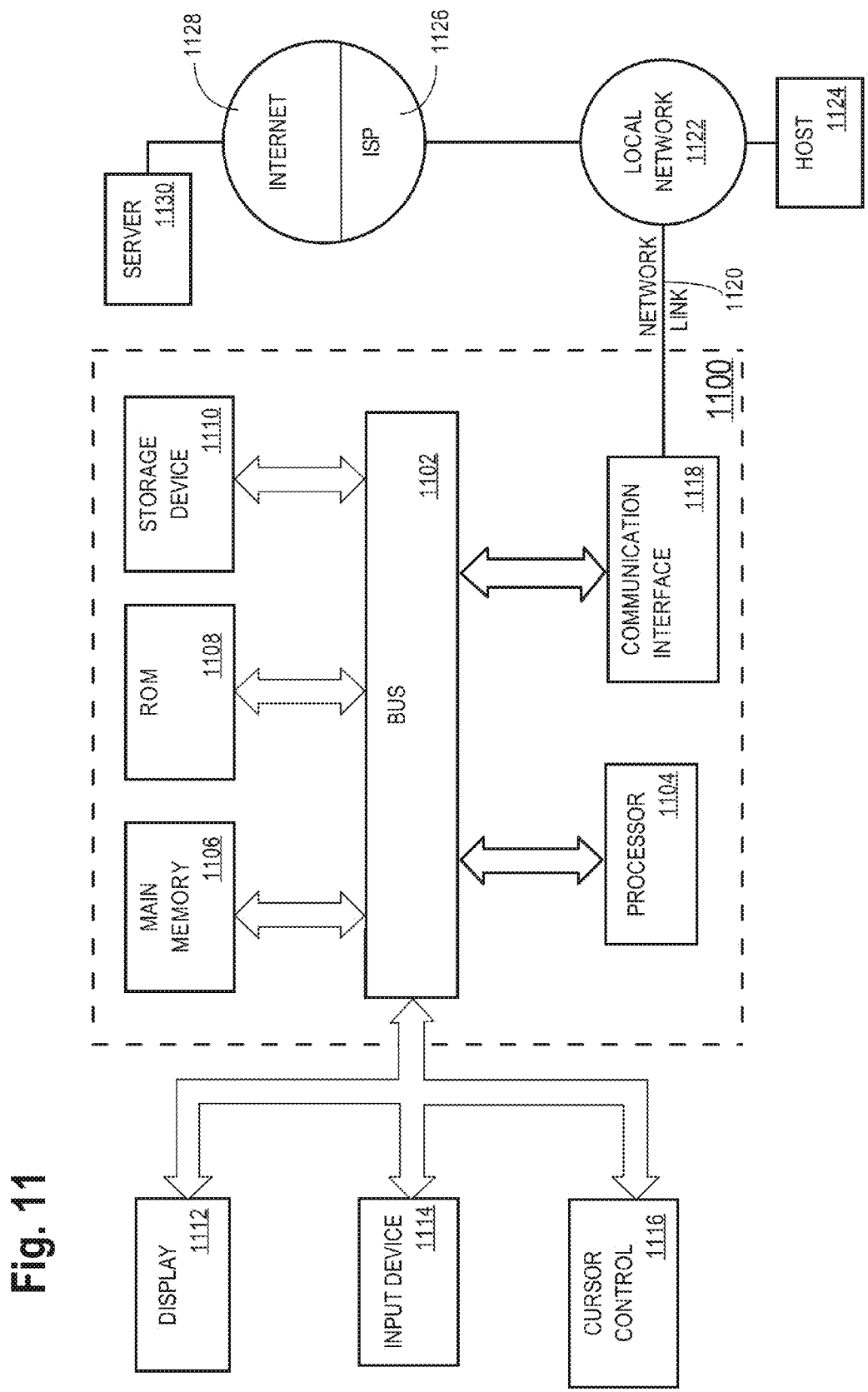
FIG. 11 is a block diagram of a computer system upon which embodiment of the invention may be implemented.

For example, FIG. 11 is a block diagram that illustrates a computer system 1100 upon which an embodiment of the invention may be implemented. Computer system 1100 includes a bus 1102 or other communication mechanism for communicating information, and a hardware processor 1104 coupled with bus 1102 for processing information. Hardware processor 1104 may be, for example, a general purpose microprocessor.

Computer system 1100 also includes a main memory 1106, such as a random access memory (RAM) or other dynamic storage device, coupled to bus 1102 for storing information and instructions to be executed by processor 1104. Main memory 1106 also may be used for storing temporary variables or other intermediate information during execution of instructions to be executed by processor 1104. Such instructions, when stored in non-transitory storage media accessible to processor 1104, render computer system 1100 into a special-purpose machine that is customized to perform the operations specified in the instructions.

Computer system 1100 further includes a read only memory (ROM) 1108 or other static storage device coupled to bus 1102 for storing static information and instructions for processor 1104. A storage device 1110, such as a magnetic disk, optical disk, or solid-state drive is provided and coupled to bus 1102 for storing information and instructions.

Computer system 1100 may be coupled via bus 1102 to a display 1112, such as a cathode ray tube (CRT), for displaying information to a computer user. An input device 1114, including alphanumeric and other keys, is coupled to bus 1102 for communicating information and command selections to processor 1104. Another type of user input device is cursor control 1116, such as a mouse, a trackball, or cursor direction keys for communicating direction information and command selections to processor 1104 and for controlling cursor movement on display 1112. This input device typically has two degrees of freedom in two axes, a first axis (e.g., x) and a second axis (e.g., y), that allows the device to specify positions in a plane.

Computer system 1100 may implement the techniques described herein using customized hard-wired logic, one or more ASICs or FPGAs, firmware and/or program logic which in combination with the computer system causes or programs computer system 1100 to be a special-purpose machine. According to one embodiment, the techniques herein are performed by computer system 1100 in response to processor 1104 executing one or more sequences of one or more instructions contained in main memory 1106. Such instructions may be read into main memory 1106 from another storage medium, such as storage device 1110. Execution of the sequences of instructions contained in main memory 1106 causes processor 1104 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 1110. Volatile media includes dynamic memory, such as main memory 1106. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 1102. Transmission media can also take the form of acoustic or light waves, such as those generated during radio-wave and infra-red data communications.

Various forms of media may be involved in carrying one or more sequences of one or more instructions to processor 1104 for execution. For example, the instructions may initially be carried on a magnetic disk or solid-state drive of a remote computer. The remote computer can load the instructions into its dynamic memory and send the instructions over a telephone line using a modem. A modem local to computer system 1100 can receive the data on the telephone line and use an infra-red transmitter to convert the data to an infra-red signal. An infra-red detector can receive the data carried in the infra-red signal and appropriate circuitry can place the data on bus 1102. Bus 1102 carries the data to main memory 1106, from which processor 1104 retrieves and executes the instructions. The instructions received by main memory 1106 may optionally be stored on storage device 1110 either before or after execution by processor 1104.

Computer system 1100 also includes a communication interface 1118 coupled to bus 1102. Communication interface 1118 provides a two-way data communication coupling to a network link 1120 that is connected to a local network 1122. For example, communication interface 1118 may be an integrated services digital network (ISDN) card, cable modem, satellite modem, or a modem to provide a data communication connection to a corresponding type of telephone line. As another example, communication interface 1118 may be a local area network (LAN) card to provide a data communication connection to a compatible LAN. Wireless links may also be implemented. In any such implementation, communication interface 1118 sends and receives electrical, electromagnetic or optical signals that carry digital data streams representing various types of information.

Network link 1120 typically provides data communication through one or more networks to other data devices. For example, network link 1120 may provide a connection through local network 1122 to a host computer 1124 or to data equipment operated by an Internet Service Provider (ISP) 1126. ISP 1126 in turn provides data communication services through the world wide packet data communication network now commonly referred to as the "Internet" 1128. Local network 1122 and Internet 1128 both use electrical, electromagnetic or optical signals that carry digital data streams. The signals through the various networks and the signals on network link 1120 and through communication interface 1118, which carry the digital data to and from computer system 1100, are example forms of transmission media.

Computer system 1100 can send messages and receive data, including program code, through the network(s), network link 1120 and communication interface 1118. In the Internet example, a server 1130 might transmit a requested code for an application program through Internet 1128, ISP 1126, local network 1122 and communication interface 1118.

The received code may be executed by processor 1104 as it is received, and/or stored in storage device 1110, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method comprising:
    receiving, at a blueprint processor, a command to create a target system based on a blueprint;
    wherein the blueprint defines a plurality of cloud resource objects for the target system;
    in response to the command, the blueprint processor processing the blueprint to create an instance of the target system;
    wherein, before the blueprint processor processes the blueprint, no instances of the plurality of cloud resource objects exist for the instance of the target system;
    wherein, after the blueprint processor processes the blueprint, instances exist for each of the plurality of cloud resource objects for the instance of the target system;
    wherein processing the blueprint includes causing creation, within a cloud system, of a plurality of resource instances that correspond to the plurality of cloud resource objects that are defined within the blueprint;
    wherein the plurality of resource instances includes a first resource instance and a second resource instance;
    while the blueprint processor is processing the blueprint, after the first resource instance has been created and before the second resource instance has been created, executing a debugging operation that performs at least one of:
        evaluates a path or expression that appears in the blueprint; or
        sets a value of an attribute associated with one of the plurality of cloud resource objects that is defined within the blueprint;
    after the debugging operation, the blueprint processor causing creation of the second resource instance responsive to continuing to process the blueprint;
    wherein the method is performed by one or more computing devices.

2. The method of claim 1 herein further comprising:
    prior to executing the debugging operation, causing the blueprint processor to cease processing the blueprint.

3. The method of claim 2 wherein causing the blueprint processor to cease processing the blueprint includes causing the blueprint processor to cease performing operations for processing the blueprint based on a pause point command.

4. The method of claim 2 wherein causing the blueprint processor to cease processing the blueprint includes causing the blueprint processor to cease performing operations for processing the blueprint based on a breakpoint specified within the blueprint.

5. The method of claim 1 further comprising:
    determining, based on dependencies between the plurality of cloud resource objects defined by the blueprint, an order to create the plurality of resource instances; and
    when processing the blueprint, creating the resource instances within the cloud system based on the order.

6. The method of claim 5 wherein the order for creating the resource instances is not explicitly defined by the blueprint.

7. The method of claim 5 wherein determining the order includes determining that a first cloud resource instance should be created before a second cloud resource instance based on the first cloud resource instance producing information that is used by the second cloud resource instance.

8. The method of claim 1 wherein:
    the debugging operation is performed using an interactive cloud explorer; and
    the method further includes using the interactive cloud explorer to perform a particular operation on a particular resource instance that is already created in the cloud system;
    the particular operation is one of:
        evaluating a path expression associated with the particular resource instance;
        executing an expression, associated with the particular resource instance, that is written in a language supported by the blueprint processor; or
        setting the value of an attribute of the particular resource instance.

9. The method of claim 8 wherein the particular operation is evaluating a path expression print associated with the particular resource instance.

10. The method of claim 1 wherein the debugging operation evaluates a path expression that appears in the blueprint.

11. The method of claim 1 wherein the debugging operation evaluates an expression that appears in the blueprint.

12. The method of claim 1 wherein the debugging operation sets a value of an attribute associated with one of the plurality of cloud resource objects.

13. The method of claim 8 wherein the particular operation is setting the value of an attribute associated with the particular resource instance.

14. A non-transitory computer-readable medium storing instructions which, when executed by one or more processors, cause performance of a method comprising:

receiving, at a blueprint processor, a command to create a target system based on a blueprint;
wherein the blueprint defines a plurality of cloud resource objects for the target system;
in response to the command, the blueprint processor processing the blueprint to create an instance of the target system;
wherein, before the blueprint processor processes the blueprint, no instances of the plurality of cloud resource objects exist for the instance of the target system;
wherein, after the blueprint processor processes the blueprint, instances exist for each of the plurality of cloud resource objects for the instance of the target system;
wherein processing the blueprint includes causing creation, within a cloud system, of a plurality of resource instances that correspond to the plurality of cloud resource objects that are defined within the blueprint;
wherein the plurality of resource instances includes a first resource instance and a second resource instance;
while the blueprint processor is processing the blueprint, after the first resource instance has been created and before the second resource instance has been created, executing a debugging operation that performs at least one of:
 evaluates a path or expression that appears in the blueprint; or
 sets a value of an attribute associated with one of the plurality of cloud resource objects that is defined within the blueprint;
after the debugging operation, the blueprint processor causing creation of the second resource instance responsive to continuing to process the blueprint.

15. A system comprising:
one or more processors;
memory, operatively coupled to the one or more processors, storing instructions executable by the one or more processors;
wherein the instructions include instructions which, when executed by the one or more processors, cause:
 receiving, at a blueprint processor, a command to create a target system based on a blueprint;
 wherein the blueprint defines a plurality of cloud resource objects for the target system;
 in response to the command, the blueprint processor processing the blueprint to create an instance of the target system;
 wherein, before the blueprint processor processes the blueprint, no instances of the plurality of cloud resource objects exist for the instance of the target system;
 wherein, after the blueprint processor processes the blueprint, instances exist for each of the plurality of cloud resource objects for the instance of the target system;
 wherein processing the blueprint includes causing creation, within a cloud system, of a plurality of resource instances that correspond to the plurality of cloud resource objects that are defined within the blueprint;
 wherein the plurality of resource instances includes a first resource instance and a second resource instance;
 while the blueprint processor is processing the blueprint, after the first resource instance has been created and before the second resource instance has been created, executing a debugging operation that performs at least one of:
  evaluates a path or expression that appears in the blueprint; or
  sets a value of an attribute associated with one of the plurality of cloud resource objects that is defined within the blueprint;
 after the debugging operation, the blueprint processor causing creation of the second resource instance responsive to continuing to process the blueprint.

\* \* \* \* \*